(12) United States Patent
Chao et al.

(10) Patent No.: US 7,451,466 B2
(45) Date of Patent: Nov. 11, 2008

(54) FEEDING MECHANISM FOR PICKUP HEAD

(75) Inventors: Chih-Hang Chao, Tu-Cheng (TW);
Yu-Hsu Lin, San Jose, CA (US);
Jeng-Da Wu, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 151 days.

(21) Appl. No.: 11/309,868

(22) Filed: Oct. 16, 2006

(65) Prior Publication Data
US 2007/0202712 A1 Aug. 30, 2007

(30) Foreign Application Priority Data
Feb. 28, 2006 (CN) .................. 2006 1 0034074

(51) Int. Cl.
*G11B 7/085* (2006.01)

(52) U.S. Cl. ..................................... 720/676

(58) Field of Classification Search ................. 720/676, 720/673
See application file for complete search history.

(56) References Cited
U.S. PATENT DOCUMENTS
5,012,462 A 4/1991 Tsujita
2006/0200839 A1* 9/2006 Tabor et al. .................. 720/676

* cited by examiner

*Primary Examiner*—Allen T Cao
(74) *Attorney, Agent, or Firm*—Wei Te Chung

(57) ABSTRACT

An exemplary optical disc drive apparatus includes a guide shaft configured to movably support a pickup head, and an elastically deformable member. The elastically deformable member includes a main body, and a cantilever slanting up from a middle part of a front edge of the main body. The cantilever is broad at a lower portion thereof and narrow at an upper portion thereof, and the cantilever is for resiliently pressing a corresponding end of the guide shaft. The elastically deformable member reduces a stress surface between the cantilever and the guide shaft, and lengthens the life span thereof.

6 Claims, 4 Drawing Sheets

FEEDING MECHANISM FOR PICKUP HEAD

FIELD OF THE INVENTION

The present invention generally relates to feeding mechanisms involving optical pickup devices, and more particularly to a mechanism for pressing a guide shaft of a pickup head in an optical disc drive apparatus.

DESCRIPTION OF RELATED ART

Optical disk drive apparatuses have been widely used in audio and video equipment for reading and/or reproducing audio, and video documents, and the like in media such as compact disk (CD), digital versatile disk (DVD), etc.

Referring to FIG. 3, a conventional optical disk drive apparatus 100, which reproduces information from an optical disk, generally includes a spindle motor 10 for rotating an optical disk arranged thereon and a pickup head 20 for reading information from a recording layer of the optical disk. The pickup head 20 is opposed to a read-out surface of the optical disk and can slide in a radial direction of the optical disk.

To slidingly move the pickup head 20 in a radial direction of the optical disk, a pickup head feeding device 30 is necessarily provided in the optical disk drive apparatus 100. A typical pickup head feeding device 30 includes a guide shaft 37 mounted at one side of an opening 55 defined in a bracket 58 of the optical disk drive apparatus 100. The pickup head 20 is slidingly supported between the guide shaft 37 and a side plate of the bracket 58. An end of the guide shaft 37 is installed on a fixing seat 39 mounted on the bracket 58 via a resilient tab 38. Referring to FIG. 4, the resilient tab 38 includes a main body 31 with a plurality of holes 32 defined therein, two opposite side plates 34 extending up from two sides of the main body 31, and a rectangular cantilever 36 slanting up from a middle part of the main body 31. In use, the rectangular cantilever 36 is configured to resiliently press the guide shaft 37. The rectangular cantilever 36 has a large stress surface contacting with the guide shaft 37, during assembly or disassembly of the guide shaft 37, a significant permanent deformation in the cantilever 36 may occur, so the cantilever 36 can not press the guide shaft 37 properly, and a life span of the resilient tab 38 is shortened. Moreover, the resilient tab 38 is usually made of Be—Cu which may pollute environment and have a high cost.

What is needed is to provide a resilient tab with a small permanent deformation for pressing the guide shaft of the pickup head.

SUMMARY OF THE INVENTION

An exemplary optical disc drive apparatus includes a guide shaft configured to movably support a pickup head, and an elastically deformable member. The elastically deformable member includes a main body, and a cantilever slanting up from a middle part of a front edge of the main body. The cantilever is broad at a lower portion thereof and narrow at an upper portion thereof, and the cantilever is for resiliently pressing a corresponding end of the guide shaft.

Other advantages and novel features of the invention will become more apparent from the following detailed description when taken in conjunction with the accompanying drawings, in which:

DETAILED DESCRIPTION OF THE INVENTION

Figure 1:
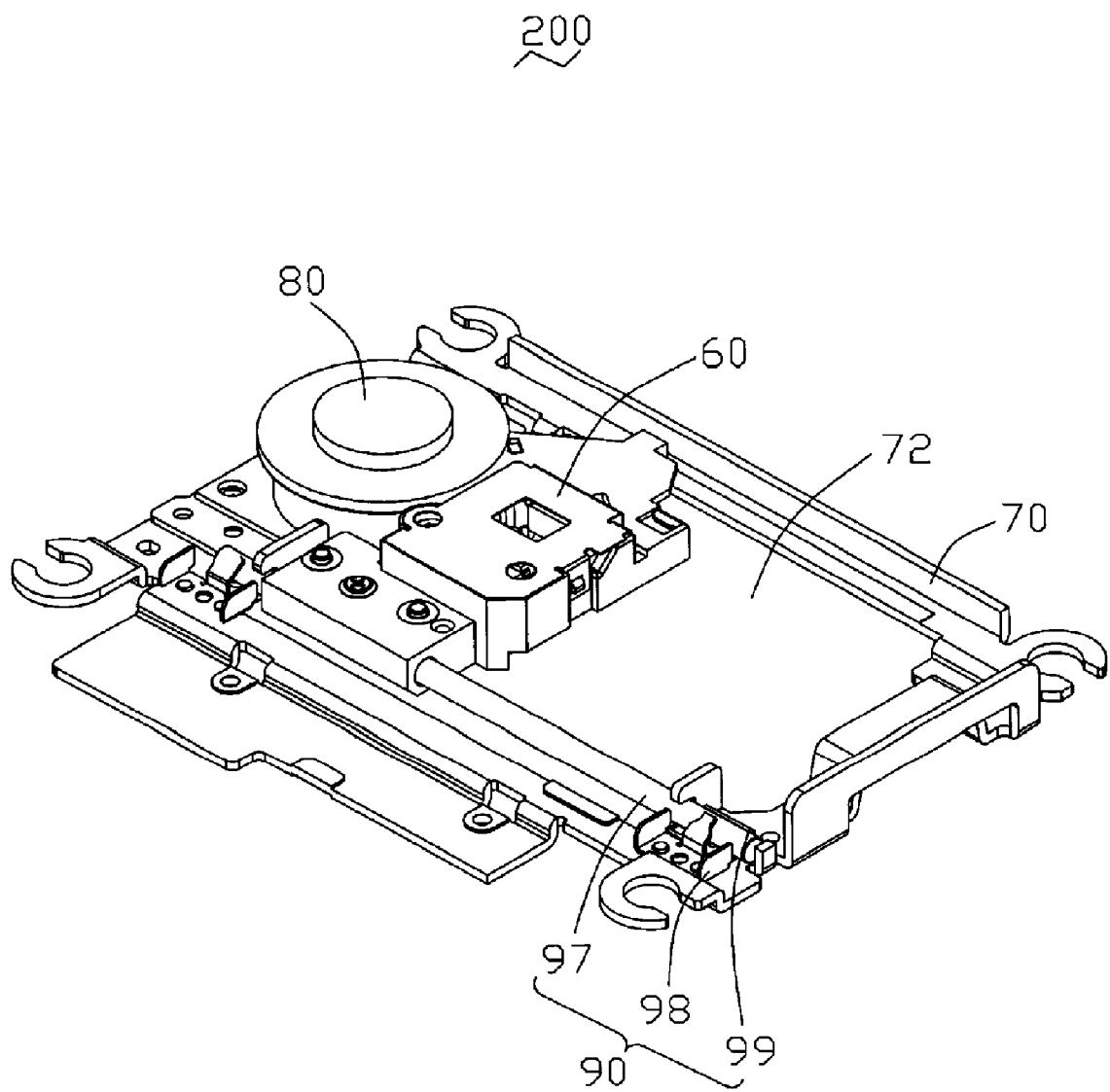
FIG. 1 is an isometric view of an optical disc drive apparatus in accordance with a preferred embodiment of the present invention.

Referring to FIG. 1, an optical disc drive apparatus 200 (not fully shown) includes a chassis 70 with a longitudinal opening 72 defined therein, a motor 80, a pickup head 60, and a feeding mechanism 90. The motor 80 is installed on the chassis 70 near a short side of the longitudinal opening 72. The motor 80 is for rotating an optical disc loaded thereon. The pickup head 60 is supported by the feeding mechanism 90 in the longitudinal opening 72 and is movable along a radial direction of the optical disc loaded on the motor 80.

The feeding mechanism 90, which supports and controls movement of the pickup head 60, includes a resilient tab 98, a guide shaft 97, and a fixing seat 99. The fixing seat 99 is located at a corner of the longitudinal opening 72 of the chassis 70, to receive an end of the guide shaft 97 therein. The resilient tab 98 is fixed to the chassis 70 to resiliently and downwardly press the guide shaft 97 in the fixing seat 99.

Figure 2:
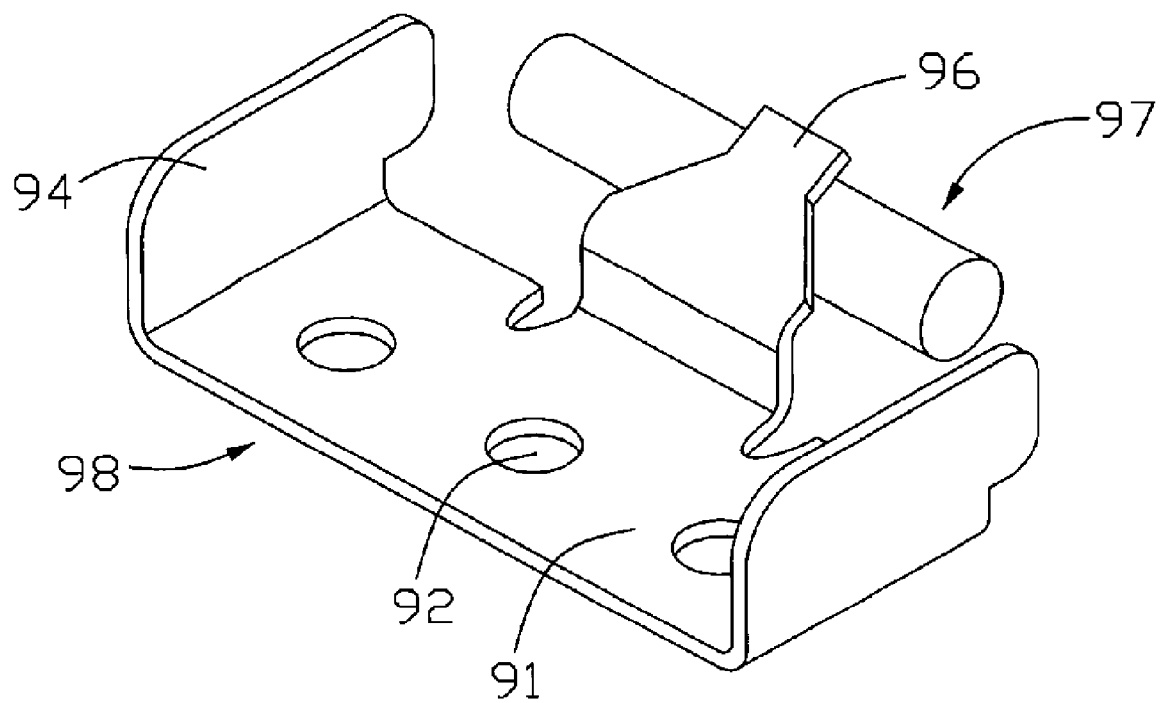
FIG. 2 is an enlarged view of a resilient tab and a guide shaft of the optical drive apparatus of FIG. 1.
Figure 3:
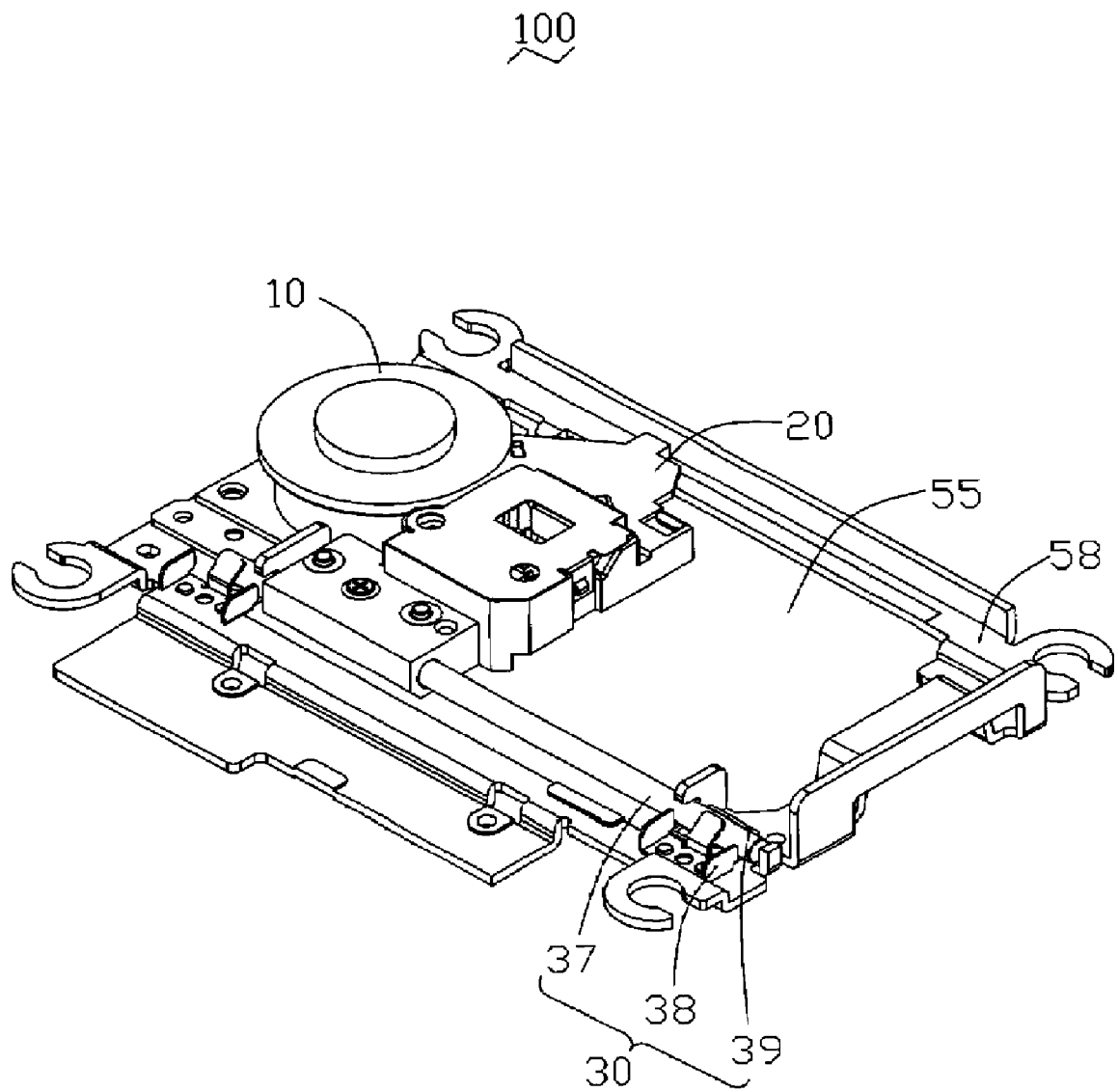
FIG. 3 is an isometric view of a conventional optical disc drive apparatus.

Referring to FIG. 2, the resilient tab 98 includes a main body 91 with a plurality of fixing holes 92 defined therein, two opposite side plates 94 extending up from the main body 91, and a cantilever 96 slanting up from a middle part of a front edge of the main body 91. The cantilever 96 is broad at a lower portion thereof and narrow at an upper portion thereof. The lower portion is configured to have a generally rectangular shape, the upper portion is configured to have a smaller rectangular shape relative to the lower portion, and a trapezoidal connecting portion connects the lower portion and the upper portion. In use, a plurality of posts formed on the chassis 70, are inserted through the fixing holes 92 for fixing the resilient tab 98 to the chassis 70. An end of the guide shaft 97 is downwardly pressed by the upper portion of cantilever 96, and a stress surface is formed between the cantilever 96 and the guide shaft 97.

Table 1 is a comparative table showing maximum von mise stress values and contact forces on the resilient tab 98 of the present invention and the conventional resilient tab 38. As shown in table 1, the contact force on the resilient tab 98 of the preferred embodiment of the present invention (shown in FIG. 2) is nearly equal to that in the conventional resilient tab 38 (shown in FIG. 4), and the maximum von mise stress value on the resilient tab 98 of the preferred embodiment of the present invention is also nearly equal to that on the conventional resilient tab 38. That is, the resilient tab 98 of the embodiment of the present invention has the same effect as the conventional resilient tab 38 in pressing the guide shaft.

TABLE 1

|  | max. von mise (MPa) | contact force (N) |
| --- | --- | --- |
| conventional resilient tab | 1043 | 32.83 |
| present resilient tab | 1055 | 32.39 |

Figure 4:
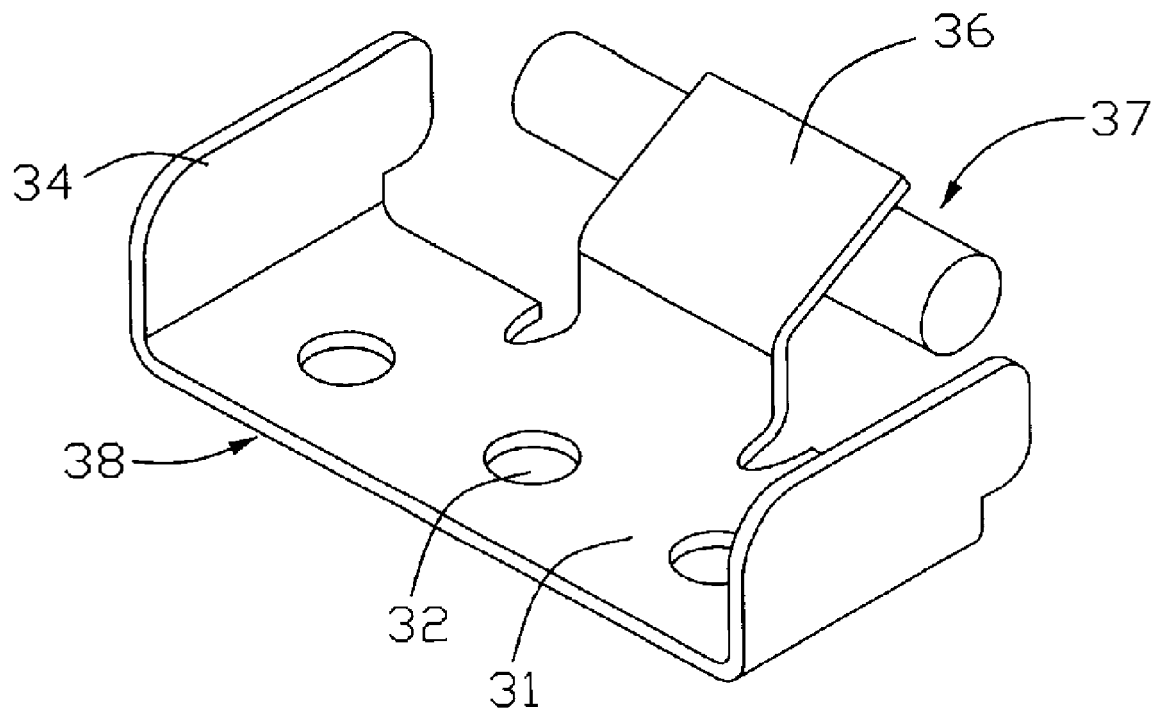
FIG. 4 is an enlarged view of a resilient tab and a guide shaft of the optical drive apparatus of FIG. 3.

Table 2 is a comparative table showing permanent deformations in a top end of the cantilever 96 of the present invention and the conventional cantilever 36, and deformation angles of the cantilever 96 of the present invention and the conventional cantilever 36. As shown in table 2, the permanent deformation at the top end of the cantilever 96 of FIG. 2 is 2.49 mm, whereas the permanent deformation at the top end of the cantilever 36 of FIG. 4 is 3.08 mm. As compared with the conventional cantilever 36, the permanent deformation in the cantilever 96 is reduced by 19.15%. The deformation angle of the cantilever 36 of FIG. 4 is 1.213 degrees, and the deformation angle of the cantilever 96 of FIG. 2 is 1.007 degrees. As compared with the conventional cantilever 36, the deformation angle of the cantilever 96 is reduced by 11.21%. It can be seen that the resilient tab 98 of the present invention has a better ability to resist deformation than the conventional resilient tab 38 does.

TABLE 2

|  | permanent deformation (mm) | deformation angle of the cantilever (degree) |
| --- | --- | --- |
| conventional resilient tab | 3.08 | 1.213 |
| present resilient tab | 2.49 | 1.007 |

As compared to the conventional resilient tab 38, the cantilever 96 of the preferred embodiment has a relatively small stress surface with the guide shaft 97, so that during assembly or disassembly of the guide shaft 97, the deformation in the cantilever 96 is reduced, and the life span of the resilient tab 98 is prolonged. Preferably, the resilient tab 38 is made of stainless steel which is environmental-friendly material with a reduced cost.

It is believed that the present embodiment and its advantages will be understood from the foregoing description, and it will be apparent that various changes may be made thereto without departing from the spirit and scope of the invention or sacrificing all of its material advantages, the example hereinbefore described merely being preferred or exemplary embodiment of the invention.

What is claimed is:

1. An optical disc drive apparatus, comprising:

a guide shaft configured for movably supporting a pickup head; and an elastically deformable member comprising a main body, and a cantilever slanting up from a middle part of a front edge of the main body, the cantilever being broad at a lower portion and narrow at an upper portion, and the cantilever being for resiliently pressing a corresponding end of the guide shaft.

2. The optical disc drive apparatus as claimed in claim 1, wherein the lower portion of the cantilever has a generally rectangular shape, the upper portion of the cantilever has a smaller rectangular shape relative to the lower portion, and a trapezoidal connecting portion connects the lower portion and the upper portion.

3. The optical disc drive apparatus as claimed in claim 1, wherein the main body of the elastically deformable member has a plurality of fixing holes defined therein.

4. The optical disc drive apparatus as claimed in claim 1, further comprising two opposite side plates extending up from the main body.

5. An elastically deformable member configured for pressing one end of a guide shaft which is configured for movably supporting a pickup head of an optical disc drive apparatus, the deformable member comprising a main body configured for being attached to a chassis of the optical disc drive apparatus, and a cantilever slantly extending up from an edge of the main body, the cantilever comprising a wide portion connecting with the main body, a narrow portion formed at a free end of the cantilever, and a trapezoidal connecting portion connecting the wide portion and the narrow portion, wherein the narrow portion is configured for resiliently pressing the one end of the guide shaft.

6. The elastically deformable member as claimed in claim 5 is made of stainless steel.

* * * * *